April 16, 1946.                A. W. OEHLER                    2,398,389
                                 WINDROWER
                            Filed April 13, 1942
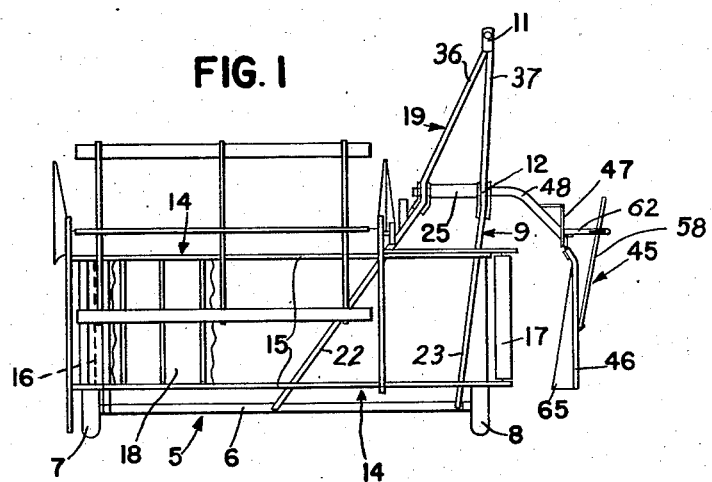
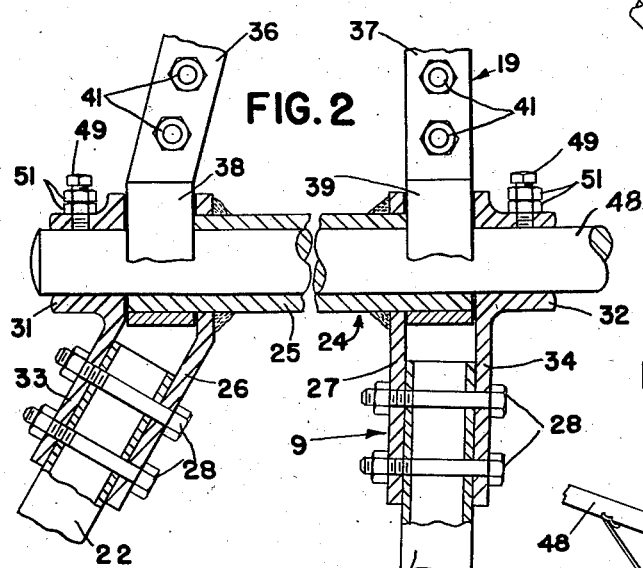
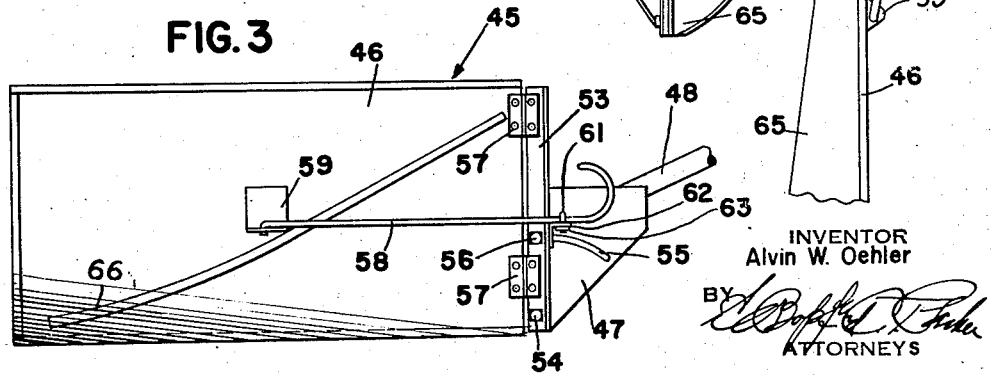
INVENTOR
Alvin W. Oehler
ATTORNEYS Patented Apr. 16, 1946

2,398,389

UNITED STATES PATENT OFFICE 2,398,389

WINDROWER

Alvin W. Oehler, Moline, Ill., assignor to Deere & Company, Moline, Ill., a corporation of Illinois Application April 13, 1942, Serial No. 438,860

16 Claims. (Cl. 56—189)

The present invention relates generally to windrow laying shields for windrowers and the like and is more particularly concerned with means for adjusting the shield vertically and laterally to control the size and position of the windrow as the material is discharged from the end of the windrower platform. One of the requirements of a windrower implement is that it lay the windrow in such a manner that it will be out of the path of the implement and tractor wheels on the next round over the field.

The principal object of the invention is to provide a simple and inexpensive shield supporting device adapted to be mounted on the windrower frame for holding the shield in the desired working position and to permit adjustment of the shield either laterally or vertically to facilitate placing the windrow in the proper position and to accommodate either light or heavy windrows.

A further object of the invention relates to the provision of a second adjusting means between the shield and the supporting device to allow the shield to be leveled or otherwise brought into a desired position of adjustment.

Other objects and advantages of the present invention will become apparent to those skilled in the art after a consideration of the following detailed description of the preferred embodiment thereof, reference being had to the accompanying drawing, in which Figure 1 is a diagrammatic plan view of a windrower implement showing the shield in an operating position;

Figure 2 is an enlarged detail view, partly in cross section, of a portion of the draft frame of the windrower, showing fragmentarily the means employed to attach the shield to the draft frame;

Figure 3 is an enlarged detail side view of the shield showing the second adjusting device;

Figure 4 is an enlarged fragmentary plan view, and

Figure 5 is a perspective view of the shield looking toward the rear of the latter approximately in line with the bottom edge thereof.

Referring now to the drawing, the reference numeral 5 indicates, in diagrammatic form, a windrower structure including the usual frame comprising a transverse member 6 supported on carrying wheels 7 and 8. A forwardly extending draft frame 9 is secured to the frame member 6 adjacent one end thereof in a conventional manner. A platform 14 is mounted on the frame 6 and is so arranged that the discharge end thereof extends outwardly beyond the wheel 8. The platform 14 includes a pair of spaced parallel frame members 15 arranged transversely of the implement. Rollers 16 and 17 are provided between the frame members 15 and at opposite ends thereof, over which is trained an endless canvas conveyor or draper 18. The conveyor 18 is of a conventional type used on windrowers and like implements, and serves to move grain or other crop material deposited thereon to a point of deposit at the stubbleward side of the implement.

A hitch frame 19 is hinged at 12 to the draft frame 9 to permit adjustment to raise or lower the platform. The draft frame 9 comprises converging bars 22 and 23 which are securely fixed to the frame member 6 and extend slightly forward of the platform 14. The forward ends of the bars 22 and 23 are spaced apart to receive a hinge bracket 24. The bracket 24 includes a horizontal cylindrical tubular member 25 and a pair of arms 26 and 27 which are fixed to the member 25 and project rearwardly adjacent the inner faces of the bars 22 and 23, respectively, and are secured thereto by bolts 28. Outer bearing brackets 31 and 32 are provided at opposite ends of the member 25 and in axial alignment therewith. The brackets 31 and 32 are provided with arms 33 and 34, respectively, which extend rearwardly adjacent the outer faces of bars 22 and 23 and are secured thereto by the bolts 28. The hitch frame 19 comprises bars 36 and 37 which are hingedly connected with the hinge bracket 24 through annular brackets 38 and 39, respectively, secured to the rear ends of bars 36 and 37 by bolts 41. The annular brackets 38 and 39 are journaled on the ends of member 25 between the members 26 and 33, and 27 and 34, and are restrained against endwise movement along the member 25 by the members 26 and 33, and 27 and 24, respectively. The bars 36 and 37 converge forwardly from the hinge 12 to the clevis member 11. Further details of construction of a windrower of this type may be found in Patent No. 2,354,962, granted August 1, 1944, to Adams, Harter and myself.

The windrow laying shield referred to in its entirety by numeral 45, includes a substantially rectangular shield member 46 which is mounted on a bracket 47 carried on an arm 48, the forward end of which slidably fits into the tubular member 25. The arm 48 is normally retained against axial or rotating movement by set screws 49 which extend through threaded openings in the brackets 31 and 32 and engage the arm 48. To adjust the shield 45 laterally or vertically to accommodate large or small windrows, the set screws 49 are loosened, the arm 48 moved so as to place the shield in the required position and the set screws again tightened against the arm 48. Lock nuts 51 are provided on each set screw 49 to lock the set screws against turning. The outer end of the arm 48 is bent rearwardly and downwardly to the vertically disposed plate 47 to which it is welded or otherwise securely fastened. A brace 52 between the plate 47 and the arm 48 strengthens the connection of these parts. An angle iron member 53 is pivotally mounted on a bolt 54 provided adjacent the lower edge of the plate 47 and extends upwardly substantially vertically. The member 53 is adjustable about the pivot 54 within the limits of a slot 55 which is provided in the plate 47, by means of a bolt 56 which extends through a hole in the member 53 and through the slot 55. This adjustment is to permit leveling the shield 46 after the arm 48 has been adjusted to a new position. The shield 46 is connected to the angle iron member 53 by hinges 57. The shield 46 may be adjusted in a horizontal plane by means of an arm 58. The arm 58 is hooked in a bracket 59 fixed to the outer face of the shield 46 and extending forwardly through an eye bolt 61 provided in a bracket 62 secured on the member 53. The forward end of the arm 58 is curved upwardly to form a handle to facilitate adjusting the shield. A nut 63 on the eye bolt 61 clamps the arm 58 to the bracket 62 to secure the shield 46 in the desired position of adjustment. As best shown in Figures 1 and 4, the lower rear corner of the shield 46 is curved inwardly at 65 to aid in better forming the windrow. A reenforcing and bracing strip 66 is rigidly fixed, as by welding, to the outer surface of the shield and extends diagonally from the forward upper corner to the rear lower corner thereof.

It will be evident from the foregoing description that the mechanism used to support the shield provides a simple and inexpensive arrangement with ample means to adjust the shield to handle any size of windrow.

What I claim is:

1. In combination with a windrower having a main frame, a transverse conveyor supported on said main frame, and a draft frame attached to said main frame, said draft frame comprising two sections connected by a hinge member, of a windrow forming shield disposed adjacent the discharge end of said conveyor, supporting means for said shield adjustably mounted in said hinge member, and an adjustable connection between said supporting means and said shield.

2. In combination with a windrower having a main frame, a transverse conveyor supported on said main frame, and a draft frame attached to said main frame, said draft frame comprising two sections connected by a hinge member, of a windrow forming shield disposed adjacent the discharge end of said conveyor, supporting means for said shield comprising an arm adjustably mounted in said hinge member and extending downwardly and rearwardly therefrom, a bracket secured on the rear end of said arm, and a connection between said bracket and said shield whereby said shield may be adjusted laterally and vertically relative to said bracket.

3. In combination with a windrower having a main frame, a transverse conveyor supported on said main frame, and a draft frame attached to said main frame, said draft frame comprising two sections connected by a hinge member, of a windrow forming shield disposed adjacent the discharge end of said conveyor, supporting means for said shield comprising an arm adjustably mounted in said hinge member and extending downwardly and rearwardly therefrom, means on said hinge member for securing said arm in any desired position, a bracket secured on the rear end of said arm, a member pivoted on said bracket and adapted to swing in a vertical plane, means for securing said member in a desired position of adjustment, hinge means for connecting said shield to said member adapted to permit said shield to be adjusted in a horizontal plane, and a securing means between said shield and said member to hold said shield in an adjusted position.

4. In an implement of the character described, a draft member comprising a pair of longitudinally extending transversely spaced bars, a transversely extending tubular bearing member secured to the forward ends of said bars, a hitch member pivotally mounted on said tubular member, a shield supporting arm journaled in said tubular bearing member, and means at each end of said bearing member and engaging said arm to secure said arm against endwise displacement.

5. In an implement of the character described, comprising a main frame, a tubular bearing member secured to said main frame, a hitch member pivotally mounted on said tubular bearing member, a shield supporting arm journaled in said bearing member, and means secured on said main frame and engageable with said arm to secure said arm against endwise displacement.

6. In an implement of the character described, a draft member comprising a pair of longitudinally extending transversely spaced bars, arms secured to said bars and extending forwardly therefrom, a transversely extending tubular bearing member secured to the forward ends of said arms, a pair of transversely spaced hitch bars pivotally mounted on said tubular bearing member, a shield supporting arm journaled in said tubular bearing member, and means at each end of said bearing member and engaging said arm to secure said shield supporting arm against endwise or rotating movement.

7. In an implement of the character described, a pair of longitudinally extending transversely spaced frame members, arms secured to the ends of said members and extending forwardly therefrom, a transversely extending tubular bearing member secured to the forward ends of said arms, said tubular bearing member extending laterally outwardly beyond each of said arms, a pair of hitch bars pivotally mounted on the extended ends of said tubular bearing member, a shield supporting arm journaled in said tubular bearing member, and a bracket at each end of said bearing member secured to said shield supporting arm and serving to retain said hitch bars in position and to lock said shield supporting arm against endwise and rotating movement, said brackets being secured to the forward ends of said frame members.

8. A windrow forming device of the class described comprising a supporting sleeve adapted to be rigidly mounted on a windrower, an arm slidable axially and rockable within said sleeve to adjust the position of the arm, means for locking said arm relative to said sleeve in adjusted position, a windrow forming shield, pivot means disposed with its axis substantially perpendicular to the shield for supporting said shield on said arm providing for vertical swinging movement relative thereto, and means for rigidly securing said shield to said arm in adjusted position.

9. A windrow forming device of the class described comprising a supporting sleeve adapted to be rigidly mounted on a windrower, an arm slidable axially and rockable within said sleeve to adjust the position of the arm, means for locking said arm relative to said sleeve in adjusted position, a windrow forming shield, a supporting member hinged thereto along one edge thereof, pivot means having an axis generally perpendicular to the axis of said hinge connection for swingably mounting said supporting member on said arm providing for angular movement relative thereto, and means for rigidly securing said shield to said arm in adjusted position.

10. A windrow forming device comprising a supporting sleeve adapted to be rigidly mounted on a windrower in a generally horizontal position transverse to the direction of travel and ahead of the point of discharge, an arm supported within said sleeve and extending laterally and inclined rearwardly therefrom, said arm being axially slidable within said sleeve for lateral adjustment and rockable within said sleeve for vertical swinging adjustment of the outer end thereof, means for locking said arm relative to said sleeve in adjusted position, a windrow forming shield, means for supporting said shield on the outer end of said arm providing for vertical swinging movement of said shield about a generally transverse axis relative to said arm, whereby the rear end of said shield can be adjusted vertically relative to the forward end thereof and adjustable transversely and vertically by shifting said arm within said sleeve.

11. A windrow forming device comprising a supporting sleeve adapted to be rigidly mounted on a windrower in a generally horizontal position transverse to the direction of travel and ahead of the point of discharge, an arm supported within said sleeve and extending laterally and inclined rearwardly therefrom, said arm being axially slidable within said sleeve for lateral adjustment and rockable within said sleeve for vertical swinging adjustment of the outer end thereof, means for locking said arm relative to said sleeve in adjusted position, a windrow forming shield, means comprising a pair of generally perpendicular, interconnected pivot members for supporting said shield on said arm providing for both vertical and horizontal swinging movement relative thereto, and means for rigidly securing said shield to said arm in adjusted position.

12. A windrow forming device comprising a supporting sleeve adapted to be rigidly mounted on a windrower in a generally horizontal position transverse to the direction of travel and ahead of the point of discharge, an arm supported within said sleeve and extending laterally and inclined rearwardly therefrom, said arm being axially slidable within said sleeve for lateral adjustment and rockable within said sleeve for vertical swinging adjustment of the outer end thereof, means for locking said arm relative to said sleeve in adjusted position, a windrow forming shield, a supporting member hinged thereto along one edge thereof, means for swingably mounting said supporting member on said arm providing for movement relative thereto about an axis generally perpendicular to the axis of said hinge connection, and means for rigidly securing said shield to said arm in adjusted position.

13. In a windrower adapted to cut and convey crops laterally to a point of discharge, an arm, means for swingably mounting said arm on the windrower ahead of said point of discharge, said arm extending laterally and rearwardly to a position outwardly of said point of discharge and swingable vertically relative to said mounting means, means for securing said arm in adjusted position, a fore and aft extending windrow forming shield, means for supporting said shield on said arm in laterally spaced arrangement relative to said point of discharge, providing for vertical swinging movement of said shield about a generally transverse axis relative to said arm, whereby the rear end of said shield can be adjusted vertically relative to the forward end thereof, said arm adjustment providing for bodily raising or lowering said shield relative to said windrower.

14. The combination set forth in claim 13, including the further provision that the lower edge of said shield curves inwardly toward said windrower to aid in forming the windrow.

15. In a windrower adapted to cut and convey crops laterally to a point of discharge, an arm, means for shiftably mounting said arm on the windrower ahead of said point of discharge, said arm extending laterally and rearwardly to a position outwardly of said point of discharge and shiftable to move the outer end vertically and horizontally relative to said point of discharge, means for securing said arm in adjusted position, a fore and aft extending windrow forming shield, means for supporting said shield on said arm in laterally spaced arrangement relative to said point of discharge, said supporting means being adjustable to provide for vertical and horizontal swinging movement of said shield relative to said arm, whereby the rear end of said shield can be adjusted vertically and laterally relative to the forward end thereof, said arm adjustment providing for bodily shifting said shield relative to the windrower.

16. The combination set forth in claim 15, including the further provision that the lower edge of said shield curves inwardly toward said windrower to aid in forming the windrow.

ALVIN W. OEHLER.